US 12,110,960 B2

United States Patent
Long et al.

(10) Patent No.: US 12,110,960 B2
(45) Date of Patent: Oct. 8, 2024

(54) WORK VEHICLE DRIVE WITH SOLENOID BOOSTED LUBRICATION PUMP

(71) Applicant: Deere & Company, Moline, IL (US)

(72) Inventors: Randall L. Long, Coffeyville, KS (US); Stacy K. Worley, Coffeyville, KS (US); Cayle D. Harmon-Moore, Independence, KS (US)

(73) Assignee: DEERE & COMPANY, Moline, IL (US)

( * ) Notice: Subject to any disclaimer, the term of this patent is extended or adjusted under 35 U.S.C. 154(b) by 296 days.

(21) Appl. No.: 17/654,128

(22) Filed: Mar. 9, 2022

(65) Prior Publication Data

US 2023/0304570 A1    Sep. 28, 2023

(51) Int. Cl.
F16H 57/04 (2010.01)
F04B 43/04 (2006.01)
F16H 57/02 (2012.01)

(52) U.S. Cl.
CPC ......... *F16H 57/0436* (2013.01); *F04B 43/04* (2013.01); *F16H 57/0412* (2013.01); *F16H 57/0439* (2013.01); *F16H 57/0476* (2013.01); *F16H 2057/02034* (2013.01); *F16H 2057/02056* (2013.01)

(58) Field of Classification Search
None
See application file for complete search history.

(56) References Cited

U.S. PATENT DOCUMENTS

| 10,207,710 | B1 | 2/2019 | Daims |
| 10,214,101 | B2 | 2/2019 | Fliearman et al. |
| 10,857,290 | B2 | 12/2020 | Locke et al. |

(Continued)

FOREIGN PATENT DOCUMENTS

| DE | 4032555 A1 | 4/1992 |
| DE | 19923154 A1 | 11/1999 |

(Continued)

OTHER PUBLICATIONS

Fuel Pumps (Automobile) What-When-How in Depth Tutorials and Information, A solenoid controls the plunger, https://what-when-how.com/automobile/fuel-pumps-automobile/, Sep. 20, 2021. (7 pages).

(Continued)

*Primary Examiner* — Daniel D Yabut
(74) *Attorney, Agent, or Firm* — KLINTWORTH & ROZENBLAT IP LLP

(57) ABSTRACT

A work vehicle drive includes a housing; an electric machine at least partially housed within the housing, configured to generate rotational power, and comprising an interface coupling at an electric machine output; a transmission at least partially housed within the housing, rotationally coupled to the interface coupling, and configured to transfer at least a portion of the mechanical power from the electric machine to a drive output; a pump at least partially housed within the housing and configured to facilitate circulation of lubrication fluid about the transmission, wherein the pump is selectively driven, in a first mode of operation, by the rotational power of the electric machine; and a solenoid device at least partially housed within the housing and configured to selectively drive the pump in a second mode of operation.

19 Claims, 11 Drawing Sheets

(56) References Cited

U.S. PATENT DOCUMENTS

| | | |
|---|---|---|
| 10,988,193 B2 | 4/2021 | Watt et al. |
| 11,060,603 B2 | 7/2021 | Waser |
| 11,148,158 B2 | 10/2021 | Engelbrecht et al. |
| 2010/0130327 A1 | 5/2010 | Morgan, Jr. |
| 2015/0226207 A1* | 8/2015 | Hines ............... F04B 9/02 417/374 |
| 2016/0040775 A1* | 2/2016 | Hwang ........... F16H 57/0439 417/423.1 |
| 2017/0167326 A1 | 6/2017 | Horimatsu et al. |
| 2018/0363761 A1* | 12/2018 | Parisi ............ F16H 61/0028 |

FOREIGN PATENT DOCUMENTS

| | | |
|---|---|---|
| DE | 10216352 A1 | 10/2003 |
| DE | 102017218556 A1 | 4/2019 |
| DE | 102019218937 A1 * | 6/2021 |

OTHER PUBLICATIONS

Buckeye Triumphs, The A Type Overdrive Unit, Part I—Theory, undated, admitted prior art. (10 pages).
German Search Report issued in application No. DE102023101931.7 dated Sep. 12, 2023 (05 pages).

* cited by examiner

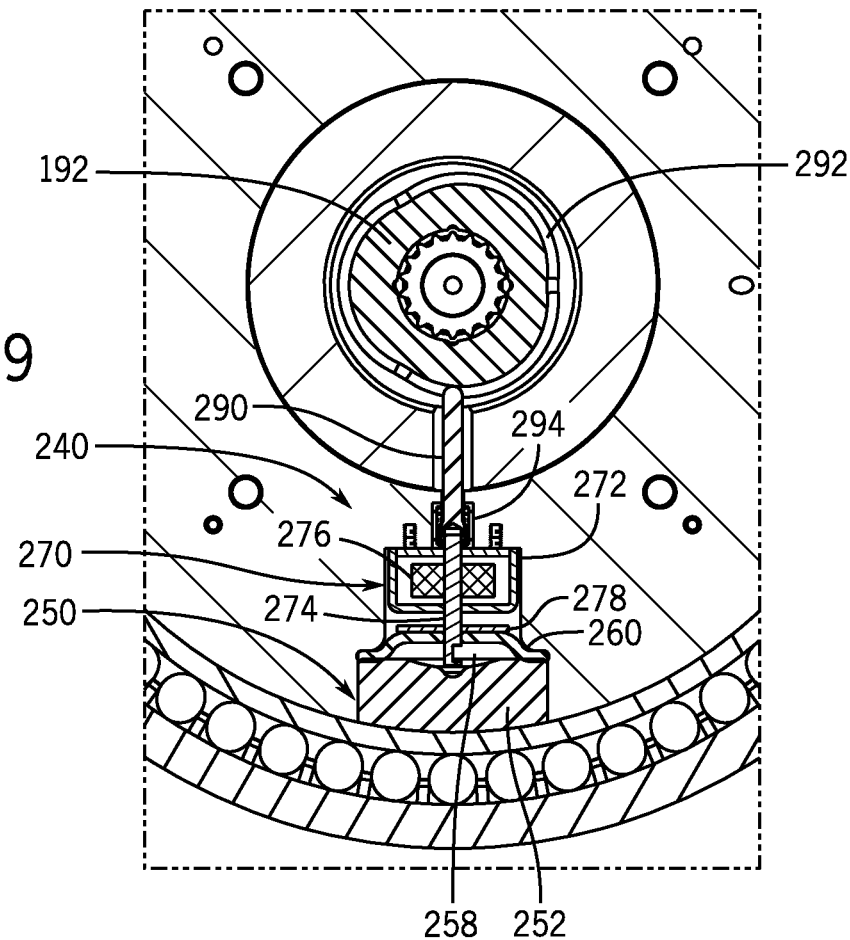
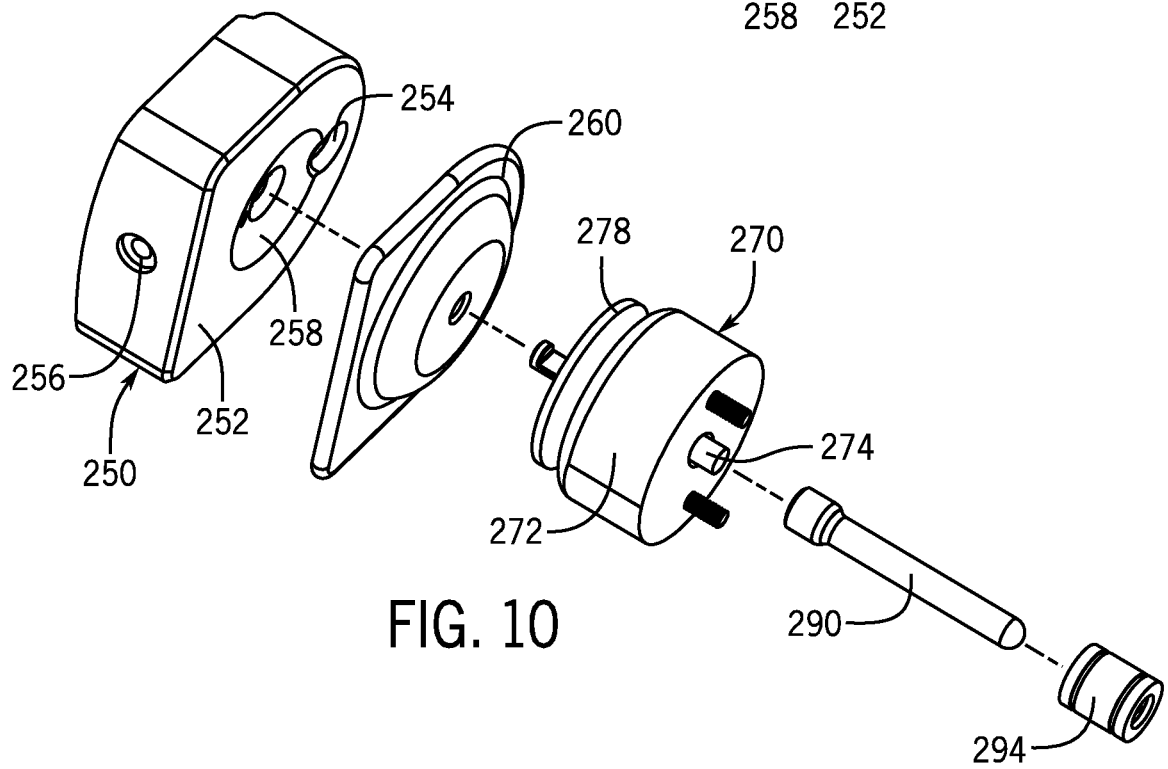

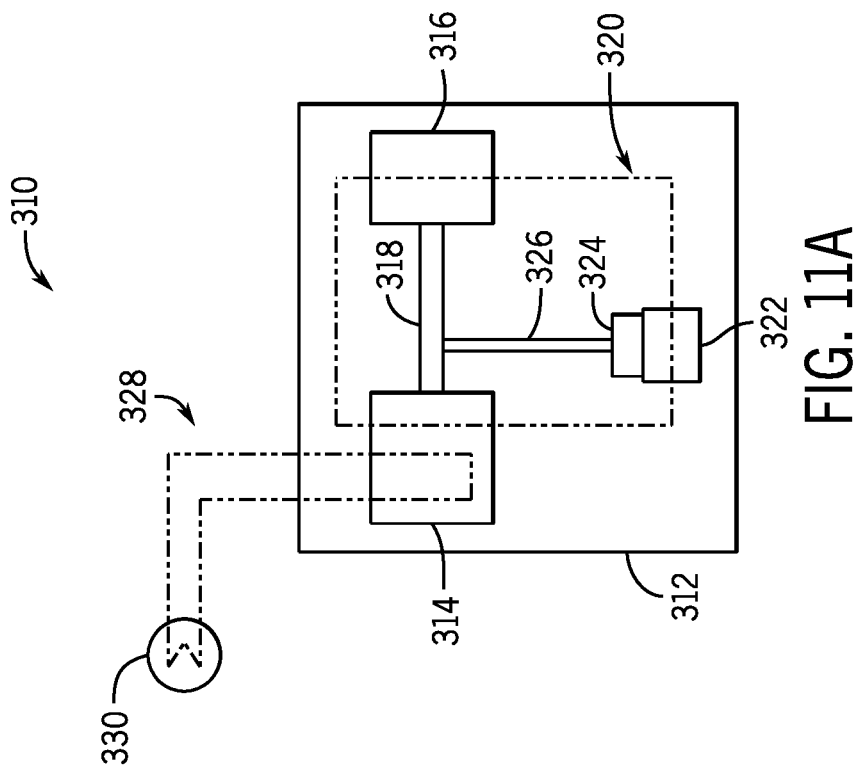

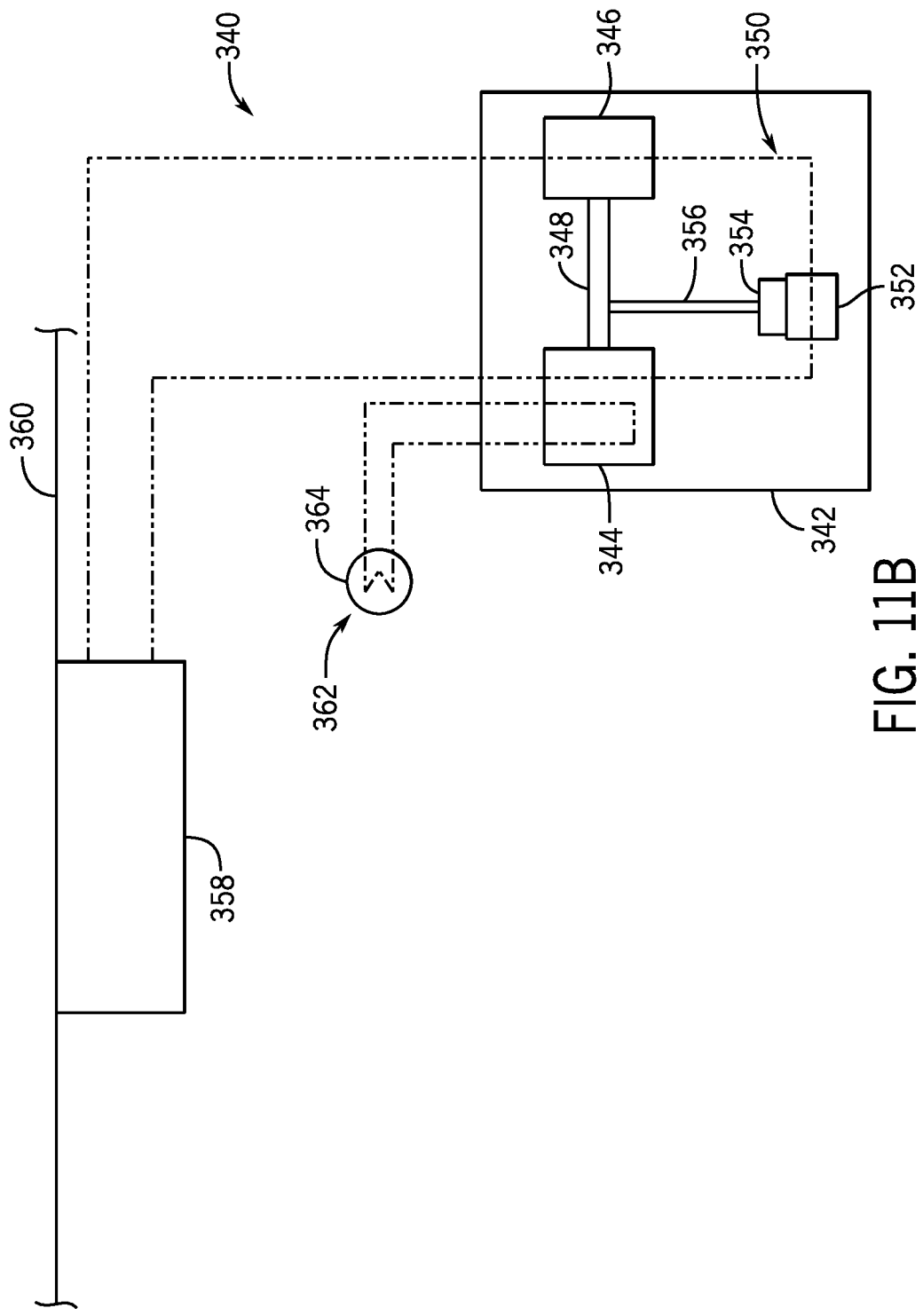

WORK VEHICLE DRIVE WITH SOLENOID BOOSTED LUBRICATION PUMP

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to drive arrangements, and in particular to final drives for work vehicles.

BACKGROUND OF THE DISCLOSURE

Work vehicles may include various drives. For example, a final drive may be mounted to a chassis to drive the wheels or tracks of the vehicle, and thereby move the vehicle over terrain. Such drive configurations conventionally include hydraulic motors for providing rotational power, and various gears for adjusting the speed of the rotational power for output at the wheel mount. Although some final drives may be use electric machines to improve various aspects of operation and performance, such arrangements may introduce additional challenges with respect to cooling, lubrication, packaging, and the like.

SUMMARY OF THE DISCLOSURE

The invention provides a drive for work vehicles.

Specifically, in one example, a work vehicle drive comprises a housing; an electric machine at least partially housed within the housing, configured to generate rotational power, and comprising an interface coupling at an electric machine output; a transmission at least partially housed within the housing, rotationally coupled to the interface coupling, and configured to transfer at least a portion of the mechanical power from the electric machine to a drive output; a pump at least partially housed within the housing and configured to facilitate circulation of lubrication fluid about the transmission, wherein the pump is selectively driven, in a first mode of operation, by the rotational power of the electric machine; and a solenoid device at least partially housed within the housing and configured to selectively drive the pump in a second mode of operation.

In a further example, a work vehicle comprises a chassis and a drive arrangement mounted to the chassis. The drive arrangement includes a housing coupled to the chassis; an electric machine at least partially housed within the housing, configured to generate rotational power, and comprising an interface coupling at an electric machine output; a transmission at least partially housed within the housing, rotationally coupled to the interface coupling, and configured to transfer at least a portion of the rotational power from the electric machine to a drive output; a pump at least partially housed within the housing and configured to facilitate circulation of lubrication fluid about the transmission, wherein the pump is selectively driven, in a first mode of operation, by the rotational power of the electric machine; and a solenoid device at least partially housed within the housing and configured to selectively drive the pump in a second mode of operation.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures:

FIG. 9 is a partial, cross-sectional view of the final drive of FIG. 8 through line 9-9 of FIG. 8;

FIG. 10 is an exploded view of a portion of a lubrication arrangement of the final drive of FIG. 2 according to an example embodiment; and FIGS. 11A-11C are schematic block diagrams of vehicle systems associated with final drives according to example embodiments.

Figure 1:
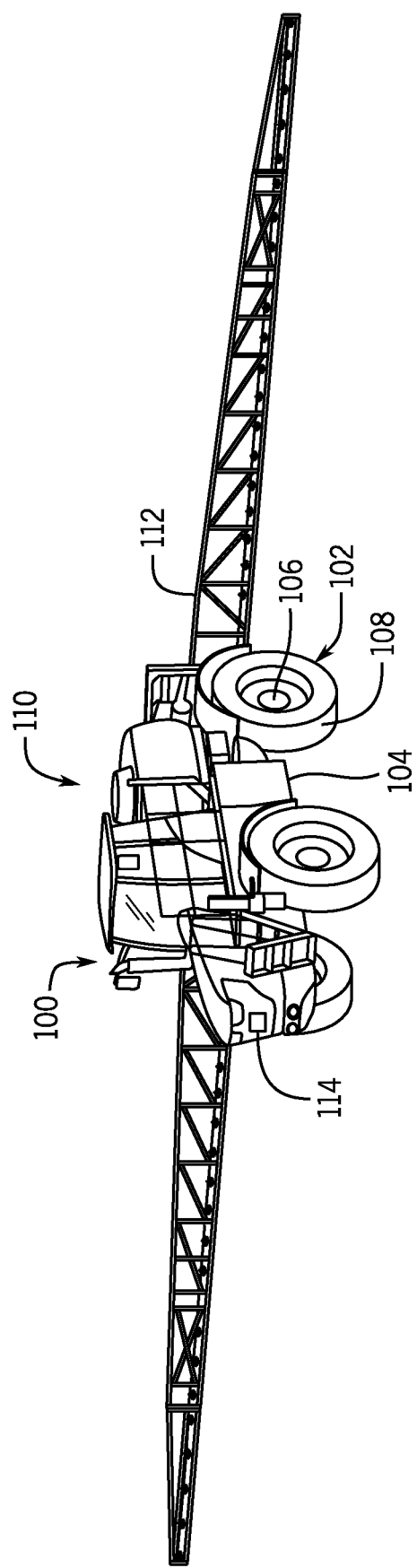
FIG. 1 is a perspective view of an example self-propelled agricultural sprayer in which one or more drives according to this disclosure may be implemented.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

Overview

In work vehicles, a drive may be utilized to provide rotational power at one or more wheel or tracks of the vehicle, and thereby drive the vehicle over terrain. An example drive includes a final drive positioned proximate to a respective wheel. Conventionally, such drives may include hydraulic motors for providing rotational power, and various gears for adjusting the speed of the rotational power for output at the wheel mount. However, such drives may present challenges with respect to variability, responsiveness, complexity, cost, size, and weight.

Disclosed herein is an example drive for work vehicles that includes an electric machine and a transmission that enables a variable and/or multi-speed output to a wheel of the work vehicle. The final drive includes a lubrication arrangement that circulates a lubricating fluid (e.g., oil) within the housing of the final drive. The lubrication system may include a pump to facilitate distribution of the fluid, and the pump may be driven by the output of the electric machine. For example, the pump may be driven by a link engaging an eccentric coupling element mounted to the output of the electric machine to provide linear motion to the link, and thus, the pump. In some conditions, the speed of the electric machine may be insufficient to circulate the lubrication fluid. As such, a solenoid device may be incorporated with the pump and pump link in order to selectively drive the pump in such conditions. In particular, examples disclosed herein provide a closed lubrication system within the final drive in which the internal pump selectively driven by the electric machine or driven by the solenoid device. In effect, the solenoid device may provide a boost to the lubrication system pump. Additional details are provided below.

As used herein, the term "axial" refers to a dimension that is generally parallel to an axis of rotation, axis of symmetry, or centerline of a component or components. For example, in a cylinder or disc with a centerline and opposite, generally circular ends or faces, the "axial" dimension may refer to the dimension that generally extends in parallel to the centerline between the opposite ends or faces. In certain instances, the term "axial" may be utilized with respect to components that are not cylindrical (or otherwise radially symmetric). For example, the "axial" dimension for a rectangular housing containing a rotating shaft may be viewed as a dimension that is generally in parallel with the rotational axis of the shaft. Furthermore, the term "radially" as used herein may refer to a dimension or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial dimension. Additionally, the terms "inboard" and "outboard" may refer to a relative lateral direction with respect to a central longitudinal axis of the vehicle. For example, "inboard" refers to a relative direction towards the center of the vehicle, and "outboard" refers to a relative direction away from the center of the vehicle.

Referring now to the drawings, the disclosed drive may be utilized in the context of a wide range of work vehicles, including, as mentioned, a sprayer. In this regard, while a sprayer is illustrated and described herein as an example work vehicle, one skilled in the art will recognize that principles of the drive disclosed herein may be readily adapted for use in other types of work vehicles, including, for example, various grader, crawler dozer, loader, backhoe and skid steer machines used in the construction industry, as well as various other machines used in the agriculture and forestry industries, such as tractors, skidders and the like. As such, the present disclosure should not be limited to applications associated with sprayers or the particular example sprayer shown and described. Moreover, although drive arrangements may be discussed below with respect to a final drive on which a wheel or track may be supported, examples disclosed herein may be used with any suitable type of work vehicle drive. Accordingly, the following description should be understood as merely establishing a non-limiting context in which embodiments of the present disclosure may be better understood.

Example Embodiments of Work Vehicle Drive with Solenoid Boosted Lubrication Pump As will become apparent from the discussion herein, the disclosed drive and associated work machine may be used advantageously in a variety of settings and with a variety of machinery. The examples below discuss drive arrangements that may be considered a final drive, e.g., at a respective wheel. However, the examples discussed below may also be incorporated into other types of drives, including a drive that powers a pair of half or stub shafts, each coupled coupled to a wheel.

Referring now to FIG. 1, disclosed examples may be included in a work vehicle (or machine) 100 as a sprayer into which one or more drive arrangements 102 are supported on a chassis (or frame) 104 to propel or assist propulsion of the work vehicle 100. Generally, and as discussed in greater detail below, each of the one or more drive arrangements 102 may include a final drive 106 coupled to the chassis 104 that drives an associated respective wheel 108 mounted on the final drive 106. As referenced in greater detail below, the final drive 106, in some examples, of the sprayer work vehicle 100 may be higher off the ground relative to other types of vehicles due to the nature of the spraying operation and/or environment.

In one example, four drive arrangements 102 and a corresponding four final drives 106 are provided for the work vehicle 100 to propel four wheels 108. In other examples, only one, two, or three final drives 106 may be provided (e.g., one or more of the wheels 108 may be unpowered). Although the work vehicle 100 of FIG. 1 depicts wheels 108 that engage the ground, in other examples, the final drives 106 discussed herein may be used to drive wheel elements that engage tracks to propel the vehicle 100 (e.g., a tracked vehicle). In addition to the final drives 106 and other components discussed below, the work vehicle 100 may additionally include any suitable system or elements to facilitate operation, including batteries and other power systems, steering systems, pumps, hydraulic systems, and the like.

One example final drive 106 is described below with reference to FIGS. 2-10 after a brief description of other aspects of the work vehicle 100 that may cooperate with the final drive 106 for overall operation of the work vehicle 100.

Generally, the work vehicle 100 is a self-propelled agricultural sprayer (e.g., via the one or more drive arrangements 102) to propel and navigate the work vehicle 100 for transport and into appropriate positions and locations for application of sprayer fluids (or chemical solutions) by a sprayer system 110. The sprayer system 110 may be supported by the chassis 104 as well as one or more spray booms 112 that are towed or otherwise supported on the chassis 104 to facilitate application of the sprayer fluids by the sprayer system 110. Although not described in detail, the sprayer system 110 may include a number of systems, sub-systems, circuits, arrangements, tanks, sensors, nozzles, pumps, lines, valves, nozzles, and the like for distributing, filling, rinsing, recirculating, and/or removing fluids within the system 110 and onto crops or at other locations.

Additionally, the work vehicle 100 may include one or more controllers 114 that facilitate operation of various systems, including the final drive 106 discussed below. Generally, controller 114 operatively coupled to one or more of the final drives 106 and other components of the vehicle 100. The controller 114 may be configured as a computing device with associated processor devices and memory architectures, as a hard-wired computing circuit (or circuits), as a programmable circuit, as a hydraulic, electrical or electro-hydraulic controller, or otherwise. As such, the controller 114 may be configured to execute various computational and control functionality with respect to the final drive 106 and/or work vehicle 100 (or other machinery). In some embodiments, the controller 114 may be configured to receive input signals in various formats (e.g., as hydraulic signals, voltage signals, current signals, and so on), and to output command signals in various formats (e.g., as hydraulic signals, voltage signals, current signals, mechanical movements, and so on). In one example, the controller 114 may be implemented with processing architecture such as a processor and memory, as well as suitable communication interfaces. For example, the controller 114 may implement functional modules or units with the processor based on programs or instructions stored in memory.

The controller 114 may be in electronic, hydraulic, mechanical, or other communication with various systems or devices of the work vehicle 100 (or other machinery), such as various actuators, sensors, and other devices within (or outside of) the work vehicle 100. The controller 114 may communicate with other systems or devices (including other controllers) in various known ways, including via a CAN bus (not shown), via wireless or hydraulic communication means, or otherwise. The controller 114 is typically arranged on the work vehicle 100 and/or final drive 106, although other locations are possible including various remote locations.

In some embodiments, the controller 114 may be configured to receive input commands and to interface with an operator via a human-machine interface, which may be disposed inside a cab of the work vehicle 100 for easy access by the operator. The human-machine interface may be configured in a variety of ways, including an input device with one or more joysticks, various switches or levers, one or more buttons, a touchscreen interface that may be overlaid on a display, a keyboard, a speaker, a microphone associated with a speech recognition system, or various other human-machine interface devices.

The controller 114 may include and/or cooperate with a communication component, which may be any suitable system for receiving data from and transmitting data, such as a Bluetooth® transceiver, a satellite transceiver, a radio transceiver, a cellular transceiver, an LTE transceiver and/or a Wi-Fi transceiver.

Accordingly, during operation in one embodiment, the controller 114 may monitor a number of input parameters that may be relevant to the final drive 106, including signals from the sensors and other systems associated with speed, power demands, fluid characteristics, electric machine characteristics, timing and/or location considerations, and the like. The controller 114 may also receive user input, e.g., from a user input device or communications system. In response, the controller 114 may send control signals to actuate various aspects of the final drive 106, including the electric machine, transmission, and lubrication arrangement, described below. In one embodiment, the controller 114 may store and implement preprogrammed instructions that automatically perform the functions described below, although other examples may utilize operator intervention.

With reference to FIGS. 2-10, an example final drive 106 will be described in greater detail. Referring initially to the outer perspective view of FIG. 2 and the cross-sectional view of FIG. 3, the final drive 106 may be considered to broadly include a final drive housing 130 that at least partially encloses and/or supports an electric machine 170, a transmission 200, and a lubrication arrangement 240. The final drive housing 130 may be formed by an inboard drive housing section 140 that is configured to be secured to the chassis 104 (FIG. 1) and an outboard drive housing 150 that is rotatably coupled to the inboard drive housing section 140 and supports a wheel 108 (FIG. 1).

The inboard drive housing section 140 may be considered to include a spindle 142 that forms the base of the inboard drive housing section 140 in order to support a number of the components housed on or therein. The spindle 142 is generally annular and may contain a number of flanges or features that facilitate operation. As described below, portions of the spindle 142 may be at least partially housed within the outboard drive housing 150. The inboard drive housing section 140 may further include an annular housing sleeve 144 that is secured over an outer circumference of a portion of the of the spindle 142. Additionally, an inboard end cap 146 may enclose a longitudinal or axial end of the inboard drive housing section 140. The end cap 146 may be a single piece or multiple pieces. The spindle 142, housing sleeve 144, and/or inboard end cap 146 may define a number of ports or interfaces that enable ingress or egress of fluids, electrical connections, and the like. For example, as shown, a number of fluid ports 148 may be defined by the housing sleeve to provide a flow of coolant for the spindle 142 and components housed within the spindle 142, as discussed in greater detail below.

The outboard drive housing 150 may be considered to include a hub 152 that is generally annular and rotatably mounted to the spindle 142 of the inboard drive housing section 140 via a number of bearing elements 160. The outboard drive housing 150 may further include an outboard end cap 154 mounted to the hub 152 and enclosing a longitudinal or axial end of the final drive 106. The hub 152 may define a number of mounting features to secure and support the associated wheel 108 (FIG. 1).

As noted, the electric machine 170 is generally housed within the spindle 142 of the inboard drive housing section 140. Generally, the electric machine 170 uses electromagnetic forces to operate as an electric motor in which electric power is converted to mechanical power that is output via an electric machine output 172. Even though the examples discussed below are discussed within the context of an electric motor, in some scenarios, the electric machine 170 may, at times, operate as a generator in which mechanical power is converted to electric power.

Figure 2:
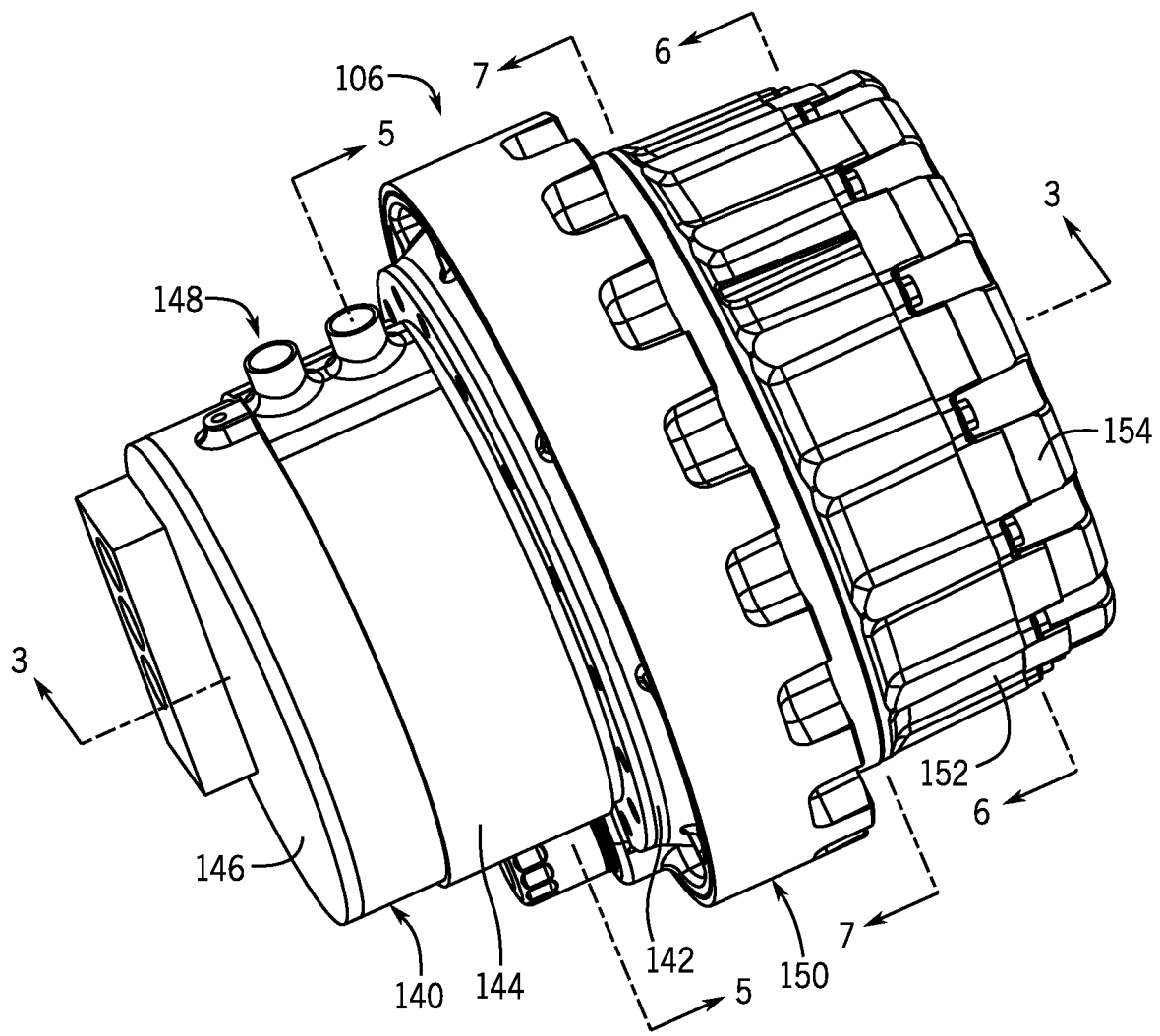
FIG. 2 is a perspective, exterior overview of an example final drive that may be implemented in the sprayer of FIG. 1 according to an example embodiment.
Figure 3:
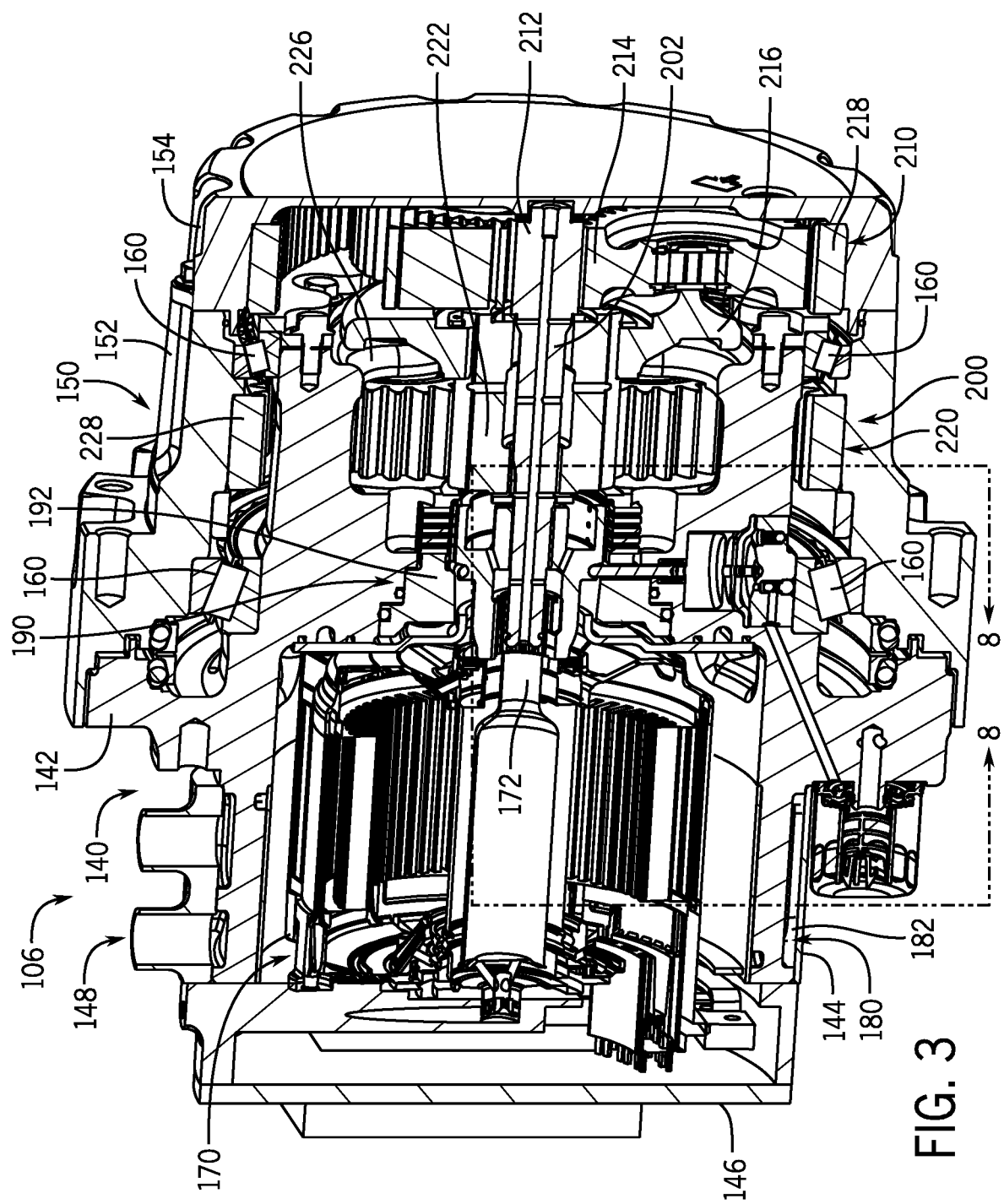
FIG. 3 is a side sectional view of the example final drive of FIG. 2 taken along line 3-3 of FIG. 2.
Figure 4:
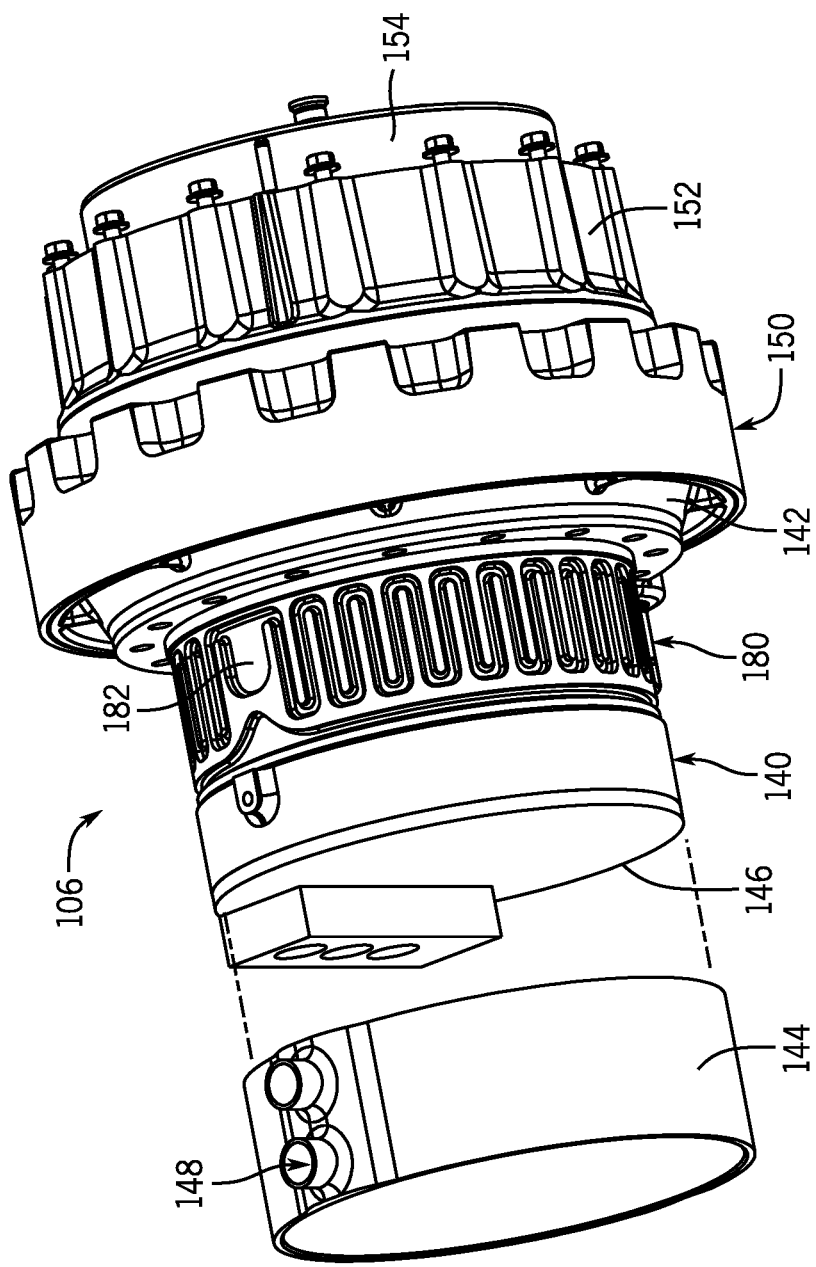
FIG. 4 is a further perspective, exterior view of the final drive of FIG. 2 with a housing portion partially removed.
Figure 5:
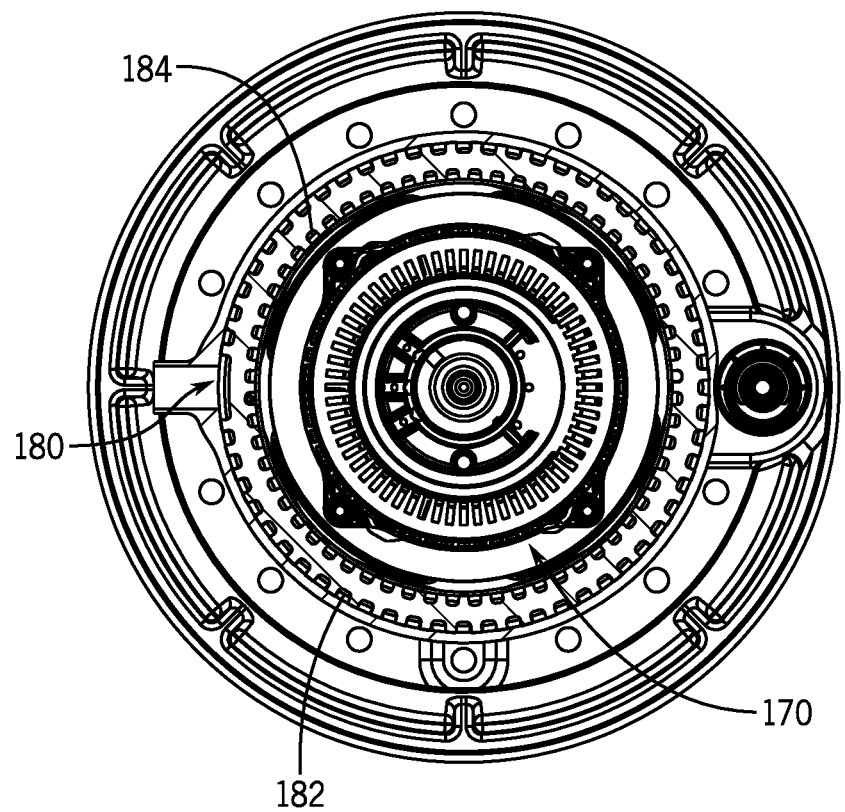
FIG. 5 is a cross-sectional view of the example final drive of FIG. 2 taken along line 5-5 of FIG. 2.
Figure 6:
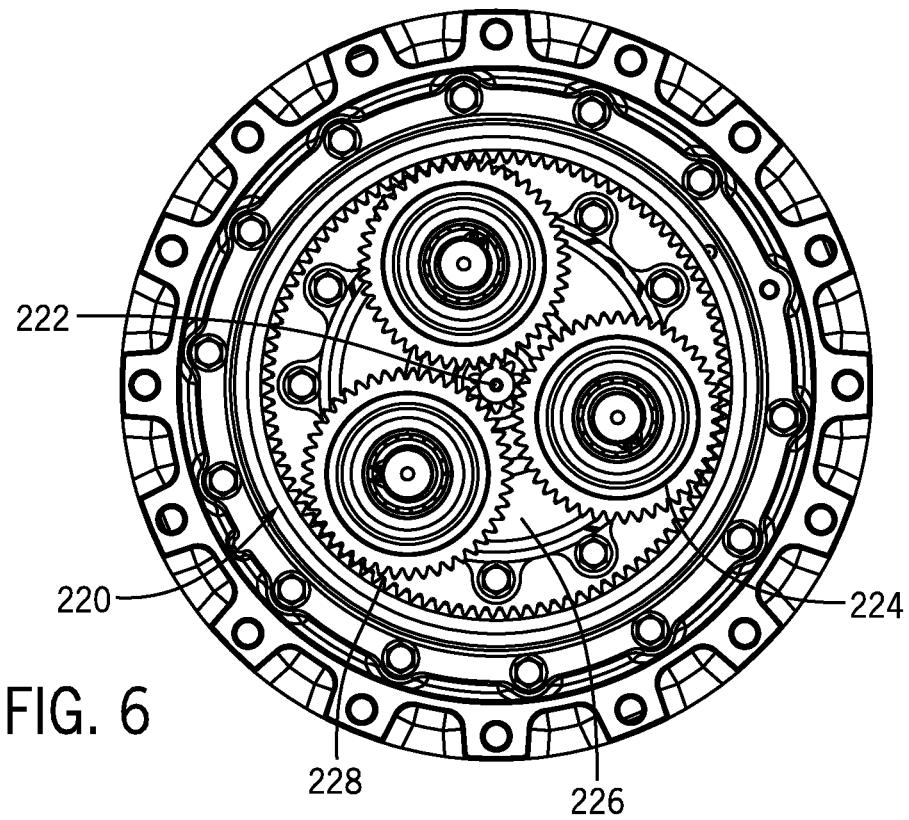
FIG. 6 is a cross-sectional view of the example final drive of FIG. 2 taken along line 6-6 of FIG. 2.

Additional reference is made to FIG. 4, which is an isometric view of the exterior of the final drive 106 with the housing sleeve 144 removed from the spindle 142, and FIG. 5, which is a cross-sectional view of the final drive 106 through line 5-5 of FIG. 2. As best shown in the views of FIGS. 3-5, the final drive 106 may be provided with an electric machine cooling arrangement 180 that includes one or more passages 182 formed within the spindle 142 that are enclosed by the housing sleeve 144 and fluidly coupled to the fluid ports 148. As a result of this arrangement, coolant may flow in and out of the ports 148 and through the passages 182 in order to absorb heat from various areas within the final drive 106. Other cooling arrangements may be provided.

As noted above, the electric machine 170 may provide mechanical power to the transmission 200. In one example, the electric machine 170 may be coupled to the transmission 200 via one or more interfaces 190 (which may be considered part of the electric machine 170, the transmission 200, or as independent elements). As shown, the interface 190 includes a coupling 192 that extends from the electric machine output 172 to a drive shaft 202 of the transmission 200, discussed below. As a result, the electric machine output 172 may drive the transmission 200 via a power flow from the electric machine output 172, through the interface coupling 192, and to the drive shaft 202. The electric machine output 172 and/or drive shaft 202 may engage with the interface coupling 192 in any suitable manner, including one or more splined connections or couplings. Generally, the interface 190 (and/or transmission 200) may further include various brakes or clutches that operate to modify, condition, connect, and/or disconnect the power flow from the electric machine 170 to the transmission 200 and/or through the transmission 200. Such brakes or clutches may be operated with hydraulic, spring, and/or electromechanical forces, as appropriate, e.g., based on signals from the controller 114.

The transmission 200 may have any suitable or desired form for transferring, modifying, and/or conditioning the mechanical power from the electric machine 170 to an output at desired torques or speeds (e.g., to drive the hub 152 and associated wheel 108 (FIG. 1)). In one example, the transmission 200 may include first and second stage planetary (or epicyclical) gear sets 210, 220, although any type of gear arrangement may be provided. As best shown by the cross-sectional view of FIG. 6, the first planetary gear set 210 has a sun gear 212 that is mounted on (or integral with) the drive shaft 202 to receive torque from the electric machine 170. A series of planet gears 214, supported on a carrier 216, surround and engage the sun gear 212. The planet gears 214 also engage a ring gear 218 that may be secured to an inner diameter of the end cap 154. As best shown by the cross-sectional view of FIG. 7, the transmission 200 may further include the second stage planetary gear set 220 with a sun gear 222 that may be selectively engaged with the first stage carrier 216 to receive torque from the first stage planetary gear set 210. The second stage planetary gear set 220 further includes a series of planet gears 224, supported by a carrier 226, that surround and engage the second stage sun gear 222. In some examples, the second stage carrier 226 may be integral with and/or otherwise supported by the spindle 142. The second stage planet gears 224 also engage a ring gear 228 that may be secured to an inner diameter of the hub 152. In one example, the ring gears 218, 228 may provide outputs to the outboard drive housing 150 to drive the wheel (FIG. 1) mounted thereon. As noted above, the transmission 200 may have any suitable structure or power flow arrangement for transferring power through the final drive 106.

Figure 7:
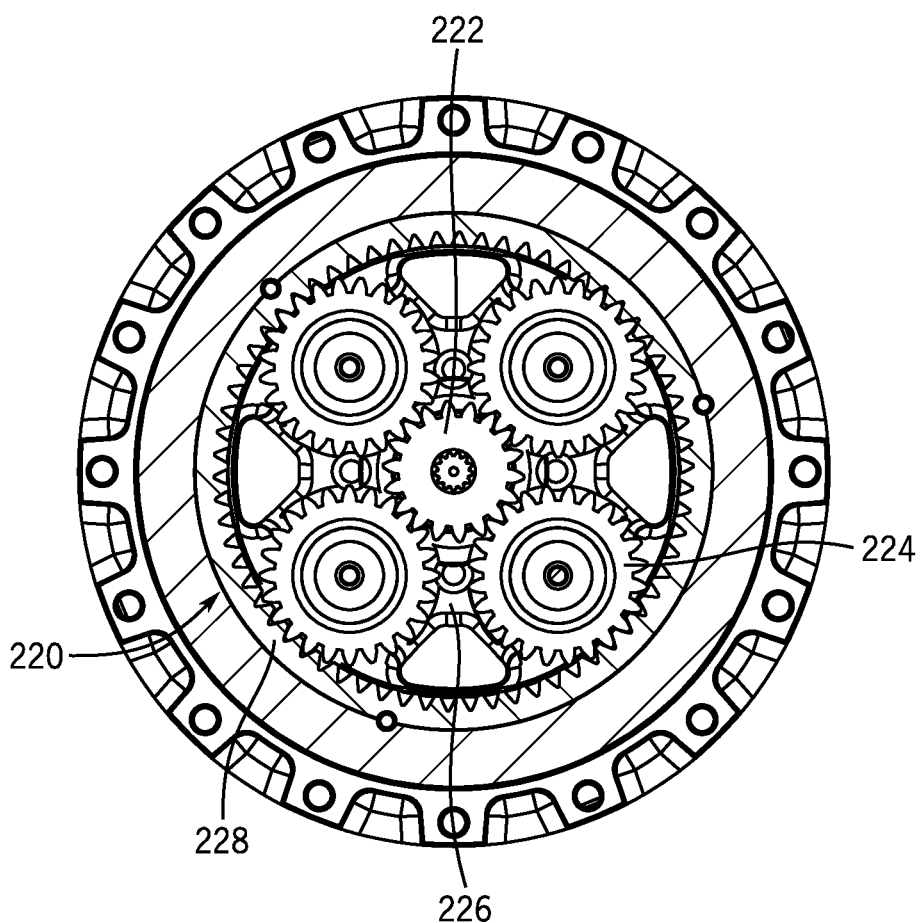
FIG. 7 is a cross-sectional view of the example final drive of FIG. 2 taken along line 7-7 of FIG. 2.
Figure 8:
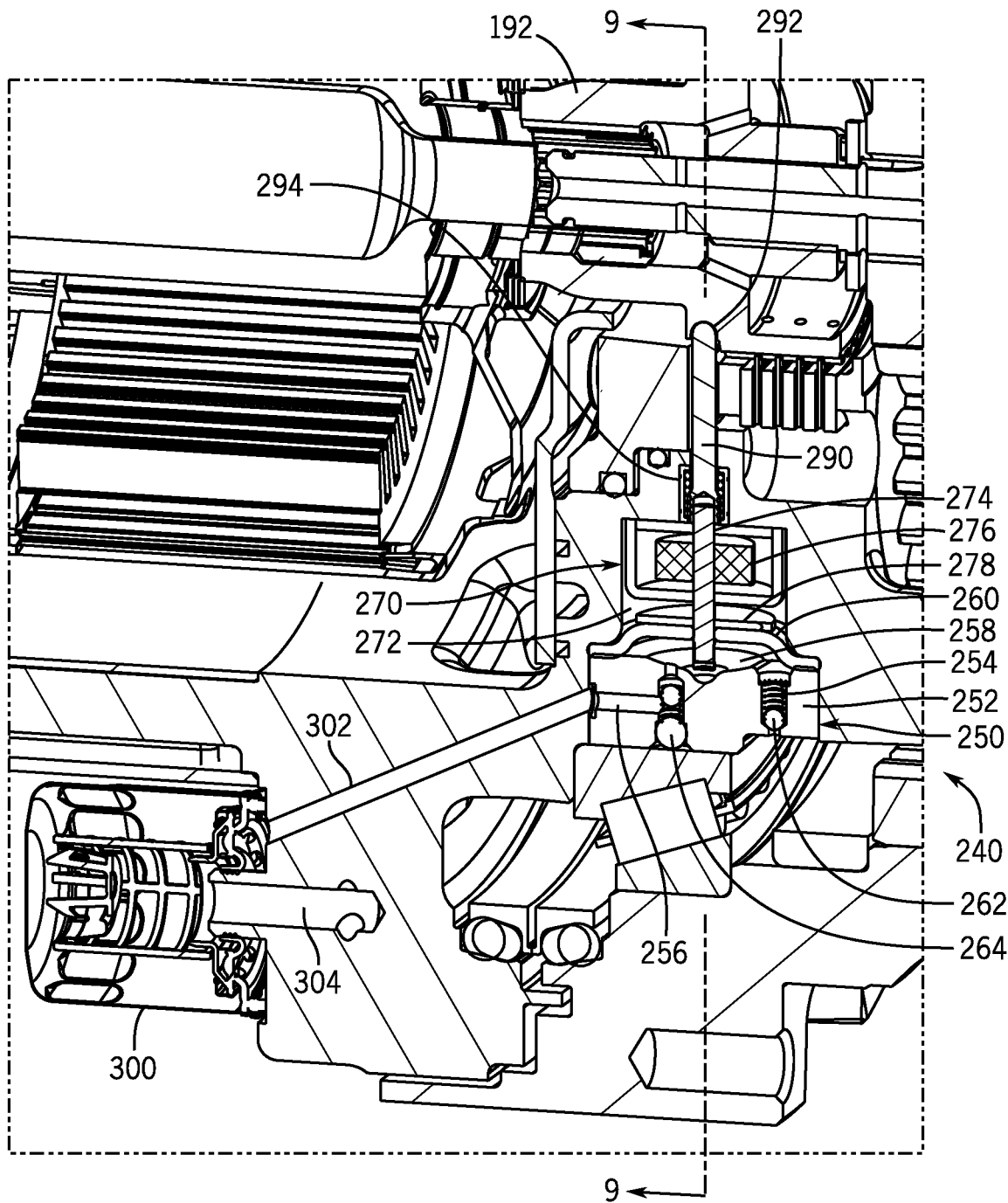
FIG. 8 is a partial, closer view of the final drive of FIG. 3 along line 8-8 of FIG. 3.

As introduced above and particularly referring to FIGS. 7, 8, and 9, the final drive 106 further includes a lubrication arrangement 240 to facilitate a distribution of a fluid (e.g., oil) through the components of the final drive 106. In one example, the lubrication arrangement 240 includes a pump 250, a solenoid device 270, and a pump link 290 that cooperate in various conditions to direct the fluid through a filter 300 and through the final drive 106 in order to distribute, clean, and/or cool the fluid within the final drive housing 230. As described below, the pump 250 may be selectively driven by either the electric machine 170 or the solenoid device 270.

In one example, the pump 250 may be considered to include a manifold 252 that defines an inlet 254, an outlet 256, a chamber 258, and a diaphragm 260. As best shown in FIG. 7, the pump 250 is at least partially housed within a feature of the spindle 142 such that the diaphragm 260 is oriented towards the interface coupling 192 between the electric machine 170 and the transmission 200. In this example, the chamber 258 in the pump manifold 252 is generally enclosed by the diaphragm 260. The inlet 254 extends from a face (e.g., the radially outward face) of the manifold 252 to the chamber 258, and the outlet 256 extends from the chamber 258 to a face (e.g., the inboard side face) of the manifold 252. As such, and as discussed in greater detail below, fluid may enter the pump 250 through the inlet 254 and flow into the chamber 258 as a result from a negative pressure upon expansion of the diaphragm 260, and fluid may flow out of the chamber 258 through the outlet 256 as a result from a positive pressure upon depressing the diaphragm 260. Check valves 262, 264 may be arranged within the pump inlet 254 and outlet 256, respectively, to prevent back flow. In some examples, the pump manifold 252 may have a curved face to enable mounting of the pump 250 on the cylindrical bearing element 160 and/or spindle 142.

Although the depicted pump 250 is a diaphragm pump in this example, other types of pumps may be provided with considerations for size limitations, operational configurations, and/or performance. In some examples, the diaphragm pump 250 may provide advantages, particularly enabling the prevention of fluid from draining back into other portions of the final drive 106 when the final drive 106 is offline.

The solenoid device 270 includes a base 272 that generally cylindrical and may be secured to the spindle 142; and the solenoid device base 272 is mounted on a radially inward side of the pump 250 and particularly proximate to the diaphragm 260 of the pump 250. The base 272 may form a housing that at least partially surrounds or houses an actuator pin (or shaft) 274 and a solenoid stator (or windings) 276. Overall, the solenoid device 270 is an electromechanical device that, upon activation of the solenoid stator 276, the solenoid actuator pin 274 is linearly actuated to move up and/or down (e.g., radially inward and/or outward). The solenoid device 270 may be configured such the solenoid actuator pin 274 is linearly actuated by the stator 276 in one direction and spring returned (or other mechanism) or in both directions based on signals from the controller 114. A first end of the solenoid actuator pin 274 is coupled to the pump link 290 and the second end is positioned proximate to the pump diaphragm 260. An actuator plate 278 is mounted at the second end of the actuator pin 274 and may abut the radially inward side of the diaphragm 260 such that actuation of the solenoid actuator pin 274 may depress the diaphragm 260 via the actuator plate 278 to drive the pump 250, as discussed in greater detail below.

The lubrication arrangement 240 further includes a pump link 290 in the form of a rod or shaft that extends from the solenoid actuator pin 274 to the interface coupling 192 of the interface 190 coupled to the electric machine 170. As best shown in FIG. 8, the interface coupling 192 may have a circumferential groove 292 into which the end of pump link 290 may be positioned. The pump link 290 may be supported at the solenoid device 270 by a bearing element 294. The bearing element 294 may facilitate and/or maintain the alignment of the pump link 290, e.g., to support the pump link 290 upon encountering lateral forces. Additionally, as best shown in FIG. 9, the interface coupling 192, and thus the groove 292, may be circumferentially eccentric with radially outwardly extending lobe portions and relatively radially inwardly extending valley portions. As such, upon rotation of the interface coupling 192, the pump link 290 may be linearly actuated in radial directions in order to operate the pump 250, as discussed in greater detail below.

In some examples, the pump link 290 may be biased radially inward to, unless otherwise actuated, abut against the interface coupling 192. Such bias may occur as a result of a spring or other such force, independent of the solenoid device 270 or by coupling with the solenoid actuator pin 274, which itself may be subject to bias force.

As such, fluid may be circulated through the pump 250, which facilitates circulation of the fluid through the final drive 106. Upon leaving the pump 250, the fluid may be filtered by the filter 300. In particular, the fluid may flow from the pump outlet 256, through an inlet passage 302 in the spindle 142 to the filter 300 and exit the filter 300 to an outlet passage 304 in the spindle 142. In some examples, the fluid (e.g., within one or both passages 302, 304 or within other portions of the final drive 106) may be cooled by directing the fluid into proximity with the coolant of the electric machine cooling arrangement 180 (e.g., via passages 184 of the spindle 142, as shown in FIG. 5), although other configurations may be provided. In this example, the fluid of the lubrication arrangement 240 is closed and is completely maintained within the final drive 106; but however, in other examples, the fluid of lubrication arrangement 240 may leave and return to the final drive 106.

As introduced above, the pump 250 may be driven in at least two ways based on operational conditions. As discussed below, the controller 114 may evaluate such conditions and send commands to the solenoid device 270 and/or other aspects of the final drive 106 in order to operate the pump 250 in a desired manner.

During a first (or nominal) mode of operation, the pump 250 is driven based on interaction between the pump link 290 and the interface coupling 192 mounted to the electric machine output 172. In particular, as the interface coupling 192 is rotated by the electric machine output 172, the pump link 290 operates as a cam within the eccentric groove 292 such that the pump link 290 is linearly actuated as it follows the groove 292 within the interface coupling 192. Specifically, when the circumferential position of the electric machine output 172 is such that the pump link 290 abuts a lobe portion of the interface coupling 192, the pump link 290 is forced radially outward (e.g., towards the solenoid device 270 and pump 250). Since the pump link 290 is coupled to the solenoid actuator pin 274, moving the pump link 290 radially outward forces the solenoid actuator pin 274 radially outward towards the pump 250, thereby depressing the diaphragm 260 and facilitating operation of the pump 250. As the electric machine 170 rotates, the circumferential position of the electric machine output 172 is such that the pump link 290 abuts a valley portion of the interface coupling 192, and the pump link 290 may be forced radially inward (e.g., away from the solenoid device 270 and pump 250). In some examples the pump link 290 may be forced radially inward, returning to the valley portion of the groove 292 by a spring or other resilient force. Since the pump link 290 is coupled to the solenoid actuator pin 274, moving the pump link 290 radially inward forces the solenoid actuator pin 274 radially inward away from the pump 250, thereby expanding the diaphragm 260 and facilitating operation of the pump 250.

At times, the rotation of the electric machine 170 may be insufficient to drive the pump 250 in a manner that is appropriate or desired to circulate the lubrication fluid through the final drive 106. For example, the electric machine 170 may be rotating too slowly to adequately drive the pump 250. In such situations, which may be referenced as a second (or supplemental) mode of operation, the solenoid device 270 may be activated to operate the pump 250. In particular, the solenoid device 270 may be energized to force the solenoid actuator pin 274 radially outward (e.g., towards the pump 250), thereby depressing the diaphragm 260 and facilitating operation of the pump 250. As the solenoid actuator pin 274 is repositioned radially inward (e.g., away from the pump 250), the diaphragm 260 may be expanded as part of the operation of the pump 250. In one example, the pump link 290 may travel with the solenoid actuator pin 274 as it moves during the second mode of operation, and in such situations, the pump link 290 may be temporarily removed from abutment with the interface coupling 192 (e.g., particularly when the solenoid device 270 operates to depress the diaphragm 260 while the circumferential position of the interface coupling 192 is such that the pump link 290 would otherwise be engaging the groove 292 at a valley portion of the interface coupling 192). In other examples, the pump link 290 may temporarily disengage with the solenoid actuator pin 274 as the solenoid actuator pin 274 moves during the second mode of operation, and in such situations, the pump link 290 may maintain abutment with the interface coupling 192 as the solenoid device 270 operates the pump 250. In either configuration example (e.g., continued engagement or temporary disengagement between the pump link 290 and the solenoid actuator pin 274), the controller 114 may monitor the position of the interface coupling 192, the pump link 290, and/or the solenoid actuator pin 274 to ensure appropriate operation in the linear movement of the pump link 290 relative to the solenoid actuator pin 274 and/or relative to the lobe and valley portions of the interface coupling 192. For example, the controller 114 may operate the solenoid device 270 such that the solenoid actuator pin 274 is not forced radially inward (e.g., away from the pump 250) while the circumferential position of the interface coupling 192 is such that the pump link 290 is at a lobe portion.

In this manner, either the solenoid device 270 or the electric machine 170 may drive the pump 250. As noted above, the controller 114 may selectively activate the solenoid device 270 to boost operation of the pump 250 based on any appropriate parameter, including electric machine speed, temperature, fluid volumes, and the like. For example, when the speed of the electric machine 170 is greater than a predetermined threshold, the controller 114 may maintain or initiate the first mode of operation in which the solenoid device 270 is inactive; and when the speed of the electric machine reaches or falls below the predetermined threshold, the controller 114 may maintain or initiate the second mode of operation in which the solenoid device 270 is activated to boost the driving of the pump 250. Operation in this manner may prevent or mitigate a pooling of the lubrication fluid in at the electric machine 170, which would otherwise inhibit operation of the electric machine 170.

Figure 11C:
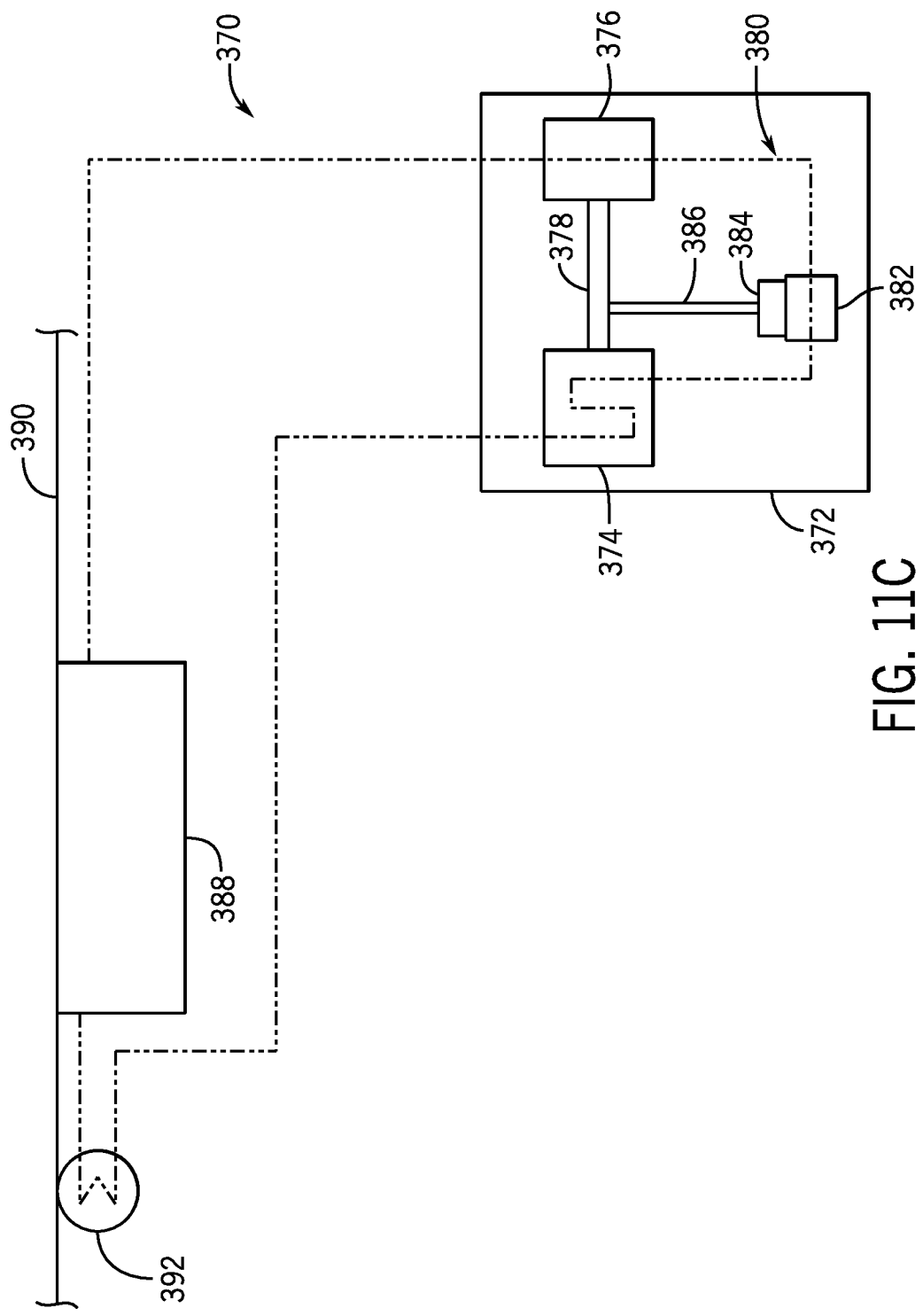

FIGS. 11A-11C are schematic block diagrams of vehicle systems 310, 340, 370 associated with final drives according to example embodiments.

Initially referring to FIG. 11A, a vehicle system 310 includes a final drive 312 that may be used to drive a wheel (or wheels) of a work vehicle. As above, the final drive 312 includes an electric machine 314 that provides torque to a transmission 316 via an interface 318. A lubrication arrangement 320 with a pump 322 circulates fluid through the interior of the final drive 312. The pump 322 may be powered by a solenoid device 324 or by the electric machine 314 via the interface 318 and pump link 326. The lubrication arrangement 320 may be passively cooled by a cooling arrangement 328 that primarily functions to cool the electric machine 314 with coolant that may flow into and out of the final drive 312. The cooling arrangement 328 may interact with elements outside of the final drive 312, including a heat exchanger 330 to remove heat from the coolant, and may further include pumps, tanks, other systems or components to facilitate cooling of the electric machine 314 and additional aspects of the work vehicle.

In this manner, the final drive 312 depicted is similar to those discussed above in which the lubrication arrangement 320 is a closed system, entirely within the housing of the final drive 312, while a separate cooling arrangement 328 operates to cool the electric machine 314 with coolant that flows into and out of the final drive 312.

Other arrangements may also be provided according to example embodiments of the disclosure discussed herein, including various lubrication and cooling arrangements, e.g., variations of open, closed, and combined arrangements. For example, as shown in FIG. 11B, a further vehicle system 340 includes a final drive 342 with an electric machine 344 that drives a transmission 346 via an interface 348. As above, the final drive 342 includes a lubrication arrangement 350 with a pump 352 driven by a solenoid device 354 or by the electric machine 344 via the interface 348 and a pump link 356. However, in this vehicle system 340, the lubrication arrangement 350 is a more open system relative to the final drive 342 in that the lubrication is directed outside of the final drive 342, e.g., to a tank 358 mounted to the chassis 360 in this example. Relative to the example arrangements discussed above, the housing may include passages or ports to enable ingress and egress of the lubrication fluid into and out of the drive 342. Such a lubrication arrangement 350 may be part of a larger lubrication system that provides fluids to other vehicle components and systems, e.g., with additional pumps, lines, tanks, heat exchangers, filters, valves, and the like. In this example, the lubrication arrangement 350 may be passively cooled, as above, by a cooling arrangement 362 for the electric machine 344, which itself may include a heat exchanger 364 outside of the final drive 342.

As a further example, as shown in FIG. 11C, a vehicle system 370 also includes a final drive 372 with an electric machine 374 providing torque to a transmission 376 via an interface 378. In this example, a combined lubrication and cooling arrangement 380 may include a pump 382 driven by a solenoid device 384 or by the electric machine 374 via the interface and a pump link 386. In this arrangement, combined lubrication and cooling arrangement 380 circulates cooling and lubrication fluid through the final drive 372, as well as into and out of the final drive 372 to outside tanks 388 coupled to a chassis 390 and cooled via a heat exchanger 392. Such a lubrication and cooling arrangement 380 may be part of larger lubrication or cooling systems that provide lubrication or cooling to other vehicle components and systems, e.g., with additional pumps, lines, tanks, heat exchangers, filters, valves, and the like.

The various configurations of lubrication or cooling arrangements 320, 328, 350, 362, 380 may provide different advantages and challenges. For example, the closed lubrication arrangement 320 may enable a relatively smaller solenoid device, and relatively open lubrication arrangements 350, 380 may provide improved cooling and reduced complexity. In general, as noted above, the solenoid device provides a boost to the circulation of the lubrication fluid to assist the output of the electric machine driving the pump. Particularly in the relatively open lubrication arrangements (e.g., arrangements 350, 380), such a solenoid device boost to the pump may prevent or mitigate the fluid pooling in the final drive, which otherwise may result in windage losses, due to the height differences between the final drive and the lubricant tank. Such issues may especially be relevant in sprayers and other work vehicles in which the height differences between the drives and tanks are relatively large.

Accordingly, drive arrangements, particularly final drives, are disclosed herein. Such drives are provided with a solenoid device boosted lubricant pump to assist the driving of the pump with the rotational output of the electric machine. Operation of the pump with the solenoid device may be selectively commanded or otherwise energized based on commands from a controller, e.g., based on machine speed or temperatures. Such lubrication arrangements may be completely internal to the final drive, or be part of a larger system with one or more external tanks. As noted above, the disclosed lubrication arrangements provide improved lubrication circulation within the final drives.

Enumerated Examples

The following examples of drives for work vehicles are further provided and numbered for ease of reference.

1. A work vehicle drive, comprising: a housing; an electric machine at least partially housed within the housing, configured to generate rotational power, and comprising an interface coupling at an electric machine output; a transmission at least partially housed within the housing, rotationally coupled to the interface coupling, and configured to transfer at least a portion of the mechanical power from the electric machine to a drive output; a pump at least partially housed within the housing and configured to facilitate circulation of lubrication fluid about the transmission, wherein the pump is selectively driven, in a first mode of operation, by the rotational power of the electric machine; and a solenoid device at least partially housed within the housing and configured to selectively drive the pump in a second mode of operation.

2. The work vehicle drive of example 1, further comprising a controller configured to selectively activate the solenoid device to drive the pump in the second mode of operation.

3. The work vehicle drive of example 2, wherein the controller is configured to selectively activate the solenoid device to drive the pump in the second mode of operation based on a speed of the electric machine.

4. The work vehicle drive of example 3, wherein the controller is configured to selectively activate the solenoid device to drive the pump as the second mode of operation when the speed of the electric machine falls below a predetermined threshold.

5. The work vehicle drive of example 1, wherein the pump is a diaphragm pump.

6. The work vehicle drive of example 1, wherein the pump includes a diaphragm configured to be depressed and expanded to drive the pump; and wherein the solenoid device is mounted proximate to the pump and includes an actuator pin that engages the diaphragm such that linear movement of the actuator pin depresses or expands the diaphragm to drive the pump.

7. The work vehicle drive of example 6, further comprising a pump link with a first end engaging the interface coupling at the electric machine and a second end engaging the actuator pin; and wherein the interface coupling at of the electric machine is eccentric such that rotation of the interface coupling imparts linear motion on the pump link, which in turn, drives the actuator pin of the solenoid device to drive the pump.

8. The work vehicle drive of example 7, wherein the actuator pin is fixed to the pump link.

9. The work vehicle drive of example 1, further comprising a cooling arrangement configured to circulate a cooling fluid to cool the electric machine and the lubrication fluid.

10. The work vehicle drive of example 9, wherein the cooling fluid and the lubrication fluid are separate fluids.

11. The work vehicle drive of example 1, wherein the pump and the solenoid device are part of a closed lubrication arrangement within the housing.

12. The work vehicle drive of example 1, wherein the pump includes a diaphragm configured to be depressed and expanded to drive the pump; and wherein the pump further includes a manifold defining a chamber at least partially enclosed by the diaphragm, an inlet extending from a first face of the manifold to the chamber, and an outlet extending from the chamber to a second face of the manifold.

13. The work vehicle drive of example 12, wherein the pump further includes a first check valve arranged within the inlet and a second check valve arranged within the outlet.

14. The work vehicle drive of example 13, wherein at least one of the faces of the manifold is curved to abut a curved surface of the housing.

15. The work vehicle drive of example 1, wherein the housing is configured to support a wheel or track as a final drive housing.

Conclusion

As will be appreciated by one skilled in the art, certain aspects of the disclosed subject matter can be embodied as a method, system (e.g., a work vehicle control system included in a work vehicle), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

Any suitable computer usable or computer readable medium can be utilized. The computer usable medium can be a computer readable signal medium or a computer readable storage medium. A computer-usable, or computer-readable, storage medium (including a storage device associated with a computing device or client electronic device) can be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium can be any tangible medium that can contain or store a program for use by or in connection with the instruction execution system, apparatus, or device.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which includes one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A work vehicle drive, comprising:
  a housing;
  an electric machine at least partially housed within the housing, configured to generate rotational power, and comprising an interface coupling at an electric machine output;

a transmission at least partially housed within the housing, rotationally coupled to the interface coupling, and configured to transfer at least a portion of the mechanical power from the electric machine to a drive output;

a pump having a diaphragm and at least partially housed within the housing and configured to facilitate circulation of lubrication fluid about the transmission, wherein the pump is selectively driven, in a first mode of operation, by the rotational power of the electric machine; and a solenoid device at least partially housed within the housing and configured to selectively drive the pump in a second mode of operation.

2. The work vehicle drive of claim 1, further comprising a controller configured to selectively activate the solenoid device to drive the pump in the second mode of operation.

3. The work vehicle drive of claim 2, wherein the controller is configured to selectively activate the solenoid device to drive the pump in the second mode of operation based on a speed of the electric machine.

4. The work vehicle drive of claim 3, wherein the controller is configured to selectively activate the solenoid device to drive the pump as the second mode of operation when the speed of the electric machine falls below a predetermined threshold.

5. The work vehicle drive of claim 1,
wherein the diaphragm is configured to be depressed and expanded to drive the pump; and
wherein the solenoid device is mounted proximate to the pump and includes an actuator pin that engages the diaphragm such that linear movement of the actuator pin depresses or expands the diaphragm to drive the pump.

6. The work vehicle drive of claim 5,
further comprising a pump link with a first end engaging the interface coupling at the electric machine and a second end engaging the actuator pin; and
wherein the interface coupling at of the electric machine is eccentric such that rotation of the interface coupling imparts linear motion on the pump link, which in turn, drives the actuator pin of the solenoid device to drive the pump.

7. The work vehicle drive of claim 6, wherein the actuator pin is fixed to the pump link.

8. The work vehicle drive of claim 1, further comprising a cooling arrangement configured to circulate a cooling fluid to cool the electric machine and the lubrication fluid.

9. The work vehicle drive of claim 8, wherein the cooling fluid and the lubrication fluid are separate fluids.

10. The work vehicle drive of claim 1, wherein the pump and the solenoid device are part of a closed lubrication arrangement within the housing.

11. The work vehicle drive of claim 1,
wherein the diaphragm is configured to be depressed and expanded to drive the pump; and
wherein the pump further includes a manifold defining a chamber at least partially enclosed by the diaphragm, an inlet extending from a first face of the manifold to the chamber, and an outlet extending from the chamber to a second face of the manifold.

12. The work vehicle drive of claim 11, wherein the pump further includes a first check valve arranged within the inlet and a second check valve arranged within the outlet.

13. The work vehicle drive of claim 12, wherein at least one of the faces of the manifold is curved to abut a curved surface of the housing.

14. The work vehicle drive of claim 1, wherein the housing is configured to support a wheel or track as a final drive housing.

15. A work vehicle, comprising:
a chassis; and
a drive arrangement mounted to the chassis and including:
a housing coupled to the chassis;
an electric machine at least partially housed within the housing, configured to generate rotational power, and comprising an interface coupling at an electric machine output;
a transmission at least partially housed within the housing, rotationally coupled to the interface coupling, and configured to transfer at least a portion of the rotational power from the electric machine to a drive output;
a pump having a diaphragm and at least partially housed within the housing and configured to facilitate circulation of lubrication fluid about the transmission, wherein the pump is selectively driven, in a first mode of operation, by the rotational power of the electric machine; and
a solenoid device at least partially housed within the housing and configured to selectively drive the pump in a second mode of operation.

16. The work vehicle of claim 15, wherein the drive arrangement further includes
at least a first wheel or track;
wherein the housing includes an inboard portion coupled to the chassis and an outboard portion on which the first wheel or track is mounted; and
wherein the drive output is coupled to the outboard portion such that the drive output transfers the rotational power to the outboard portion, which in turn, drives the first wheel or track.

17. The work vehicle of claim 15, further comprising a controller configured to selectively activate the solenoid device to drive the pump as the second mode of operation when the speed of the electric machine falls below a predetermined threshold.

18. The work vehicle of claim 15,
wherein the diaphragm is configured to be depressed and expanded to drive the pump; and
wherein the solenoid device is mounted proximate to the pump and includes an actuator pin that engages the diaphragm such that linear movement of the actuator pin depresses or expands the diaphragm to drive the pump.

19. The work vehicle of claim 15, wherein the pump and the solenoid device are part of a closed lubrication arrangement within the housing.

\* \* \* \* \*